(12) United States Patent
Geng

(10) Patent No.: US 12,088,128 B2
(45) Date of Patent: Sep. 10, 2024

(54) BATTERY PACK AND CHARGING BALANCING METHOD FOR THE SAME

(71) Applicant: Nanjing Chervon Industry Co., Ltd., Nanjing (CN)

(72) Inventor: Zheng Geng, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 269 days.

(21) Appl. No.: 17/106,814

(22) Filed: Nov. 30, 2020

(65) Prior Publication Data

US 2021/0184473 A1    Jun. 17, 2021

(30) Foreign Application Priority Data

Dec. 11, 2019    (CN) .......................... 201911265475.2

(51) Int. Cl.
*H02J 7/00* (2006.01)
*H01M 10/44* (2006.01)

(52) U.S. Cl.
CPC ......... *H02J 7/0014* (2013.01); *H01M 10/443* (2013.01); *H02J 7/0016* (2013.01); *H02J 7/0047* (2013.01); *H02J 7/007182* (2020.01); *H02J 7/007186* (2020.01); *H02J 7/007192* (2020.01); *H02J 7/007194* (2020.01)

(58) Field of Classification Search
CPC ...... H02J 7/0014; H02J 7/0016; H02J 7/0047; H02J 7/007182; H02J 7/007192; H02J 7/007194; H01M 10/443
USPC ....................................................... 320/118
See application file for complete search history.

(56) References Cited

U.S. PATENT DOCUMENTS

| | | | | |
|---|---|---|---|---|
| 5,952,815 A * | 9/1999 | Rouillard | ............... | H02J 7/0048 320/122 |
| 6,060,864 A * | 5/2000 | Ito | .................. | G01R 31/396 320/136 |
| 7,081,737 B2* | 7/2006 | Liu | .................. | H02J 7/0018 320/130 |
| 7,696,725 B2* | 4/2010 | Liu | .................. | H02J 7/0018 320/136 |
| 7,719,231 B2* | 5/2010 | Pellenc | ............... | H01M 10/441 320/158 |
| 8,004,246 B2* | 8/2011 | Liu | .................. | H02J 7/0018 320/136 |
| 8,085,051 B2* | 12/2011 | Iida | .................. | H01M 10/48 324/433 |

(Continued)

FOREIGN PATENT DOCUMENTS

| CN | 103701163 A | 4/2014 |
|---|---|---|
| CN | 107947268 A | 4/2018 |

*Primary Examiner* — John T Trischler
(74) *Attorney, Agent, or Firm* — Greenberg Traurig, LLP

(57) ABSTRACT

A battery pack and a charging method for the same is described. The battery pack includes at least one cell set including multiple cells connected in series. The charging method includes detecting a temperature of the battery pack under a preset state and a voltage of each of the multiple cells, the preset state being a state in which a charging circuit is disconnected and the battery pack is inserted in a charger after the battery pack has been fully charged, calculating a voltage difference between at least two cells in the battery pack based on the voltage of each cell, and determining whether to activate a balancing operation based on the voltage difference and the temperature.

5 Claims, 6 Drawing Sheets

(56) References Cited

U.S. PATENT DOCUMENTS

| | | | | |
|---|---|---|---|---|
| 8,098,048 B2* | 1/2012 | Hoff | H02J 7/0016 | 320/120 |
| 8,154,250 B2* | 4/2012 | Yu | H02J 7/0016 | 320/135 |
| 8,198,862 B2* | 6/2012 | Zhang | B60L 58/22 | 320/118 |
| 8,237,411 B2* | 8/2012 | Liu | H01M 10/441 | 320/136 |
| 8,242,745 B2* | 8/2012 | Zhang | B60L 58/22 | 320/120 |
| 8,513,922 B2* | 8/2013 | Yang | H02J 7/0014 | 320/152 |
| 8,704,488 B2* | 4/2014 | Yun | H02J 7/0048 | 320/124 |
| 8,723,481 B2* | 5/2014 | Zhang | H01M 10/441 | 320/118 |
| 8,836,290 B2* | 9/2014 | Liu | H02J 7/0018 | 320/136 |
| 8,917,061 B2* | 12/2014 | Zhu | H02J 7/0016 | 320/122 |
| 8,994,337 B2* | 3/2015 | Kim | H02J 7/0016 | 320/136 |
| 9,077,054 B2* | 7/2015 | Hanai | H01M 10/482 | |
| 9,172,259 B2* | 10/2015 | Hwang | H02J 3/32 | |
| 9,525,289 B2* | 12/2016 | Yoshida | G01R 31/382 | |
| 9,537,330 B2* | 1/2017 | Crane | H01M 10/443 | |
| 9,592,744 B2* | 3/2017 | Zhao | B60L 58/12 | |
| 9,726,731 B2* | 8/2017 | Yang | G01R 31/396 | |
| 10,211,490 B2* | 2/2019 | Okada | H01M 10/482 | |
| 10,236,693 B1* | 3/2019 | Button | H02J 7/0016 | |
| 10,277,044 B2* | 4/2019 | Geng | H02J 7/007192 | |
| 10,298,034 B2* | 5/2019 | Lei | H02J 9/06 | |
| 10,326,287 B2* | 6/2019 | Hoyt | H02J 7/0024 | |
| 10,525,832 B2* | 1/2020 | Zhao | B64C 39/024 | |
| 10,608,294 B2* | 3/2020 | Sasaki | H02J 7/007194 | |
| 10,625,613 B2* | 4/2020 | Zhao | B60L 58/12 | |
| 10,790,678 B2* | 9/2020 | Zheng | H02J 7/0014 | |
| 10,797,491 B2* | 10/2020 | Sasaki | G01K 1/14 | |
| 10,906,427 B2* | 2/2021 | Zhao | B60L 58/12 | |
| 11,056,729 B2* | 7/2021 | Sato | G01R 31/371 | |
| 11,128,158 B2* | 9/2021 | Mulawski | H02J 7/0047 | |
| 11,128,160 B2* | 9/2021 | Dong | H02J 7/007 | |
| 11,159,039 B2* | 10/2021 | Matsumura | H01M 10/482 | |
| 11,211,812 B2* | 12/2021 | Zhang | H02J 7/0013 | |
| 2004/0257042 A1* | 12/2004 | Liu | H02J 7/0018 | 320/130 |
| 2006/0076923 A1* | 4/2006 | Eaves | G01T 1/249 | 320/112 |
| 2006/0255769 A1* | 11/2006 | Liu | H01M 10/441 | 320/134 |
| 2007/0009784 A1* | 1/2007 | Pal | H01M 8/1213 | 429/432 |
| 2007/0257642 A1* | 11/2007 | Xiao | H02J 7/00304 | 320/134 |
| 2008/0084182 A1* | 4/2008 | Oberlin | H01M 10/4207 | 320/116 |
| 2008/0309286 A1* | 12/2008 | Hoff | H02J 7/0019 | 320/162 |
| 2009/0039830 A1* | 2/2009 | Pellenc | H02J 7/0014 | 320/116 |
| 2009/0315515 A1* | 12/2009 | Yu | H02J 7/0016 | 320/116 |
| 2010/0066379 A1* | 3/2010 | Iida | H02J 7/0016 | 324/434 |
| 2010/0141209 A1* | 6/2010 | Shiu | H02J 7/0016 | 320/120 |
| 2010/0188046 A1* | 7/2010 | Liu | H01M 10/441 | 702/63 |
| 2010/0188047 A1* | 7/2010 | Liu | H02J 7/0018 | 320/118 |
| 2010/0253285 A1* | 10/2010 | Takahashi | H02J 7/00038 | 320/134 |
| 2011/0068744 A1* | 3/2011 | Zhu | H02J 7/0016 | 320/116 |
| 2011/0089897 A1* | 4/2011 | Zhang | H02J 7/0016 | 320/116 |
| 2011/0121789 A1* | 5/2011 | Yang | H02J 7/04 | 320/152 |
| 2011/0133690 A1* | 6/2011 | Crane | H02J 7/0068 | 320/160 |
| 2011/0140650 A1* | 6/2011 | Zhang | H02J 7/0016 | 320/118 |
| 2011/0210701 A1* | 9/2011 | Nakamura | H02J 7/0018 | 320/118 |
| 2011/0298425 A1* | 12/2011 | Liu | H01M 10/441 | 320/118 |
| 2011/0316483 A1* | 12/2011 | Zhang | H01M 10/486 | 320/118 |
| 2012/0032641 A1* | 2/2012 | Yun | H02J 7/0048 | 320/118 |
| 2012/0119709 A1* | 5/2012 | Mull | H02J 7/0016 | 320/149 |
| 2012/0161707 A1* | 6/2012 | Kim | H02J 7/0016 | 320/118 |
| 2013/0082658 A1* | 4/2013 | Hanai | H02J 7/0016 | 320/118 |
| 2013/0088202 A1* | 4/2013 | Kamata | H02J 7/0016 | 320/126 |
| 2013/0335036 A1* | 12/2013 | Zhang | H02J 7/0047 | 320/162 |
| 2014/0145678 A1* | 5/2014 | Hwang | H02J 3/32 | 320/118 |
| 2015/0035495 A1* | 2/2015 | Yoshida | H01M 10/425 | 320/134 |
| 2015/0158392 A1* | 6/2015 | Zhao | B64C 39/024 | 320/109 |
| 2015/0185289 A1* | 7/2015 | Yang | H02J 7/0013 | 320/112 |
| 2016/0056655 A1* | 2/2016 | Kaneda | H02J 7/0016 | 320/136 |
| 2017/0117587 A1* | 4/2017 | Sugeno | G01R 31/371 | |
| 2017/0125856 A1* | 5/2017 | Okada | H01M 10/4285 | |
| 2017/0136901 A1* | 5/2017 | Zhao | B60L 58/22 | |
| 2017/0155262 A1* | 6/2017 | Geng | H02J 7/00038 | |
| 2017/0163060 A1* | 6/2017 | Zheng | H02J 7/0019 | |
| 2017/0264123 A1* | 9/2017 | Mulawski | H02J 9/062 | |
| 2017/0331305 A1* | 11/2017 | Xiang | H02J 7/00306 | |
| 2018/0006490 A1* | 1/2018 | Lei | H02J 9/06 | |
| 2018/0145520 A1* | 5/2018 | Sasaki | H01M 10/633 | |
| 2018/0151919 A1* | 5/2018 | Sasaki | H01M 10/486 | |
| 2018/0278065 A1* | 9/2018 | Hoyt | H02J 7/0024 | |
| 2019/0061540 A1* | 2/2019 | Zhao | B64C 39/024 | |
| 2019/0092181 A1* | 3/2019 | Zhao | B64C 39/024 | |
| 2019/0140457 A1* | 5/2019 | Dong | H02J 7/00309 | |
| 2020/0064408 A1* | 2/2020 | Sato | H02J 7/0021 | |
| 2020/0076013 A1* | 3/2020 | Sato | H02J 7/0047 | |
| 2020/0127339 A1* | 4/2020 | Nakano | H01M 50/269 | |
| 2020/0139821 A1* | 5/2020 | Yamasaki | H01M 10/441 | |
| 2020/0161877 A1* | 5/2020 | Zhang | H02J 7/0047 | |
| 2020/0350777 A1* | 11/2020 | Zhang | H02J 7/0013 | |
| 2020/0412153 A1* | 12/2020 | Matsumura | H02J 7/0047 | |
| 2021/0006078 A1* | 1/2021 | Zheng | H02J 7/0014 | |
| 2021/0021144 A1* | 1/2021 | Geng | H02J 7/00032 | |
| 2021/0044129 A1* | 2/2021 | Sasaki | H02J 7/0047 | |
| 2021/0143650 A1* | 5/2021 | Wang | H02J 7/0063 | |
| 2021/0143664 A1* | 5/2021 | Tsai | H01M 10/448 | |
| 2021/0152011 A1* | 5/2021 | Deng | H01M 10/44 | |
| 2021/0245623 A1* | 8/2021 | Zhao | B64C 39/024 | |
| 2021/0281083 A1* | 9/2021 | Liu | H02J 7/0016 | |
| 2021/0328441 A1* | 10/2021 | Sun | H02J 7/00036 | |
| 2022/0013814 A1* | 1/2022 | Kirleis | H02J 7/35 | |
| 2022/0077703 A1* | 3/2022 | Nakao | H02J 7/34 | |
| 2022/0077704 A1* | 3/2022 | Zhang | H02J 7/0013 | |
| 2022/0102988 A1* | 3/2022 | Zhang | H02J 7/0068 | |
| 2022/0247186 A1* | 8/2022 | Qin | H02J 7/0014 | |
| 2022/0255326 A1* | 8/2022 | Carlson | H02J 50/00 | |
| 2022/0271537 A1* | 8/2022 | Mikhaylik | H01M 4/382 | |
| 2024/0030723 A1* | 1/2024 | Kurachi | H01M 10/44 | |

\* cited by examiner

BATTERY PACK AND CHARGING BALANCING METHOD FOR THE SAME

RELATED APPLICATION INFORMATION

This application claims the benefit of CN 201911265475.2, filed on Dec. 11, 2019, the disclosure of which is incorporated herein by reference in its entirety.

TECHNICAL FIELD

Examples of the present disclosure relate to the technical field of battery packs and, in particular, to a battery pack and a cell balancing method.

BACKGROUND

To facilitate the use of a power tool, a battery pack is typically used to supply power for the power tool. The battery pack in the power tool is composed of multiple cells connected in series or in parallel and can supply power for the power tool for a long term.

After repeated use of the power tool, however, the voltages of the cells in the battery pack may become different because of aging of these cells, thus shortening the service life of the battery pack. In the related art, an external charging and discharging protection circuit is usually used to protect the battery pack.

SUMMARY

Examples of the present disclosure provide a battery pack and a charging balancing method and system for the same. Thus, the voltage difference between the cells in the battery pack can be reduced, the usage of the battery pack can be improved, and the aging of the cells is mitigated.

A first example of the present disclosure provides a charging balancing method for a battery pack. The battery pack is configured to provide electrical energy for a power tool. The battery pack includes at least one cell set. The cell set includes a plurality of cells that are connected in series. The charging balancing method includes the following operations.

The temperature of the battery pack under a preset state and the voltage of each cell are detected. The preset state is a state in which a charging circuit is disconnected and the battery pack is inserted in a charger after the battery pack has been fully charged.

The voltage difference between at least two cells in the battery pack is calculated based on the voltage of each cell.

A determination is made as to whether to activate a balancing operation based on the voltage difference and the temperature.

A second example of the present disclosure provides a charging balancing system for a battery pack. The system includes a voltage detection module, a temperature detection module, and a control module.

The voltage detection module is configured to detect the voltage of each cell in the battery pack under a preset state.

The temperature detection module is configured to detect the temperature of the battery pack under the preset state.

The control module is electrically connected to the voltage detection module and the temperature detection module. The control module is configured to calculate a voltage difference between at least two cells in the battery pack based on the voltage of the cell and determine whether to activate a balancing operation based on the voltage difference and the temperature.

A third example of the present disclosure further provides a battery pack including a charging balancing system for the battery pack. The battery pack further includes a housing and a cell set.

DETAILED DESCRIPTION

Figure 1:
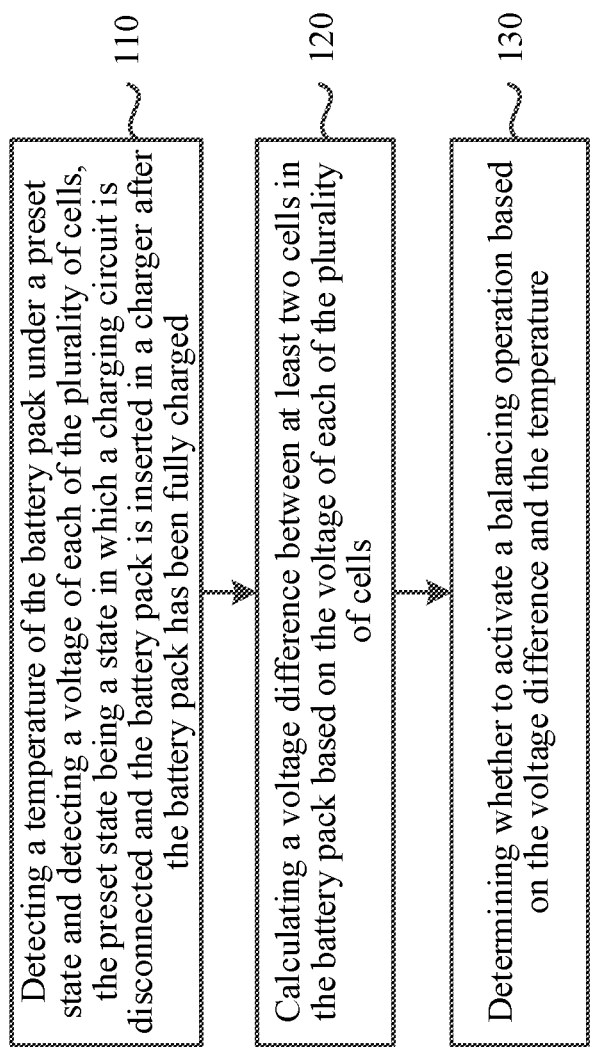
FIG. 1 is a flowchart illustrating a charging balancing method for a battery pack according to a first example of the present disclosure.

Hereinafter the present disclosure will be described in detail in connection with drawings and examples. It is to be understood that the examples described below are merely intended to illustrate and not to limit the present disclosure. In addition, it is to be noted that for ease of description, only part, not all, of the structures related to the present disclosure are illustrated in the drawings.

FIG. 1 is a flowchart of a charging balancing method for a battery pack according to an example of the present disclosure. Referring to FIG. 1, this method may be implemented by a charging balancing system for a battery pack, and specifically may be implemented by software and/or hardware in the charging balancing system for a battery pack. This charging balancing system for a battery pack is set in the battery pack. The charging balancing method for a battery pack provided in examples of the present disclosure includes the following operations.

In step 110, the temperature of the battery pack in a preset state and the voltage of each cell are detected. The preset state is a state in which a charging circuit is disconnected and the battery pack is inserted in a charger after the battery pack has been fully charged.

Specifically, as the charging time increases during the charging process, the battery pack generates a certain amount of heat so that the temperature of the cell rises. In the case where the temperature of the cell is relatively high, the internal polarization resistance of the cell is relatively small. Therefore, the internal resistance of the cell is relatively small, and the cell voltage measured in this case is more accurate. The preset state is a state in which the charging circuit is disconnected and the battery pack is still inserted in the charger after the battery pack has been fully charged. A voltage detection module detects the voltage of each cell in the battery pack, and a temperature detection module detects the temperature of the battery pack. Exemplarily, in the case where the battery pack is fully charged, the charging circuit is disconnected, the charger stops charging the battery pack, and the battery pack is inserted in the charger. In this case, the temperature of the battery pack is immediately detected by the temperature detection module, and the cell voltage of each cell in the battery pack is measured by the voltage detection module. For example, in this case, the temperature of the battery pack is 45° C., and the voltage of one cell is 4V in the case where the temperature of the battery pack is measured in real time at 45° C. Of course, during the charging process of the battery pack, the temperature of the battery pack does not change suddenly. Therefore, in the condition where it is detected that the temperature of the battery pack satisfies a temperature range in the preset state, it may be considered that the internal resistance of the cell in this state is relatively small so that the detected cell voltage is relatively accurate.

In step 120, the voltage difference between at least two cells in the battery pack is calculated according to the voltage of each of the plurality of cells.

Specifically, the battery pack includes multiple cells. Since the characteristics of the cells are not completely consistent, it inevitably leads to the condition that the voltages of the cells are different during the charging process. Therefore, the voltage difference between at least two cells may be calculated. For example, the control module in the charging system for a battery pack may calculate the voltage difference between at least two cells.

In step 130, a determination is made as to whether to activate a balancing operation based on the voltage difference and the temperature.

Specifically, after the battery pack has been fully charged, since the characteristics of the cells in the battery pack are not fully consistent, one or several cells may have high voltages. To ensure that all cells in the battery pack have the same working state, it is necessary to discharge the cells with high cell voltages so that all cells can be balanced. The starting of the balancing operation of the battery pack may be determined by the control module in the charging balancing system for a battery pack. The measurement accuracy of the cell voltage is related to the internal resistance of the cell, and the internal resistance of the cell is affected by the temperature of the cell. Therefore, the measurement of the voltage of each cell in the battery pack at a preset temperature can ensure that the accuracy of the measured cell voltage is relatively high. In the case where it is detected that the voltage difference between the cell with the maximum voltage and the cell with the minimum voltage in the battery pack satisfies a preset condition and the temperature of the battery pack is within a preset value range, it may be determined to activate the balancing operation. Exemplarily, after the battery pack has been fully charged, the temperature of the battery pack is detected as 45° C. The cell voltage of the first cell is 4.20V, the cell voltage of the second cell is 4.16V, and the voltage difference between the first cell and the second cell is 40 mV. In this case, the voltage preset condition is satisfied, and thus it is determined to activate the balancing operation.

Optionally, based on the preceding example, the step of determining whether to activate the balancing operation based on the voltage difference and the temperature includes the following operations.

If the absolute value of the voltage difference is greater than or equal to a preset voltage value and the temperature of the battery pack satisfies a preset temperature value, then the balancing operation is started.

Specifically, after the battery pack has been fully charged, the cells in the battery pack are balanced. The purpose is to make the voltages of all cells close to each other so that the cells can operate within the allowable voltage range and the following problem can be solved: the service life of the battery pack is affected due to the voltage difference between the cells. In the case where it is detected that the absolute value of the voltage difference between two cells is greater than or equal to the preset voltage value, it may be determined that there is a voltage difference between the two cells. The temperature of the cell has a relatively great impact on the internal resistance of the cell. Therefore, in the condition where the temperature of the battery pack also satisfies the preset temperature value in this case, it means that the measurement results of the voltage values of two cells in the current state are accurate so that it is determined to activate the balancing operation.

The preset voltage value is 0 to 100 mV excluding 0 mV at the endpoint, and the preset temperature value is 30 to 55° C. Exemplarily, after the battery pack has been fully charged, it is detected that the temperature of the cell is 45° C. The cell voltage of the first cell is 4.20V, the cell voltage of the second cell is 4.16V, and the voltage difference between the first cell and the second cell is 40 mV. In this case, the preset condition where the absolute value of the voltage difference is greater than or equal to the preset voltage value is satisfied and the temperature of the battery pack also satisfies the preset temperature value, and thus it is determined to activate the balancing operation. The accuracy of the measurement equipment cannot reach zero error. Therefore, in the actual application process, the preset voltage value is generally not selected as 0 V. The temperature of each cell satisfies the preset temperature value. The preset temperature value is determined based upon an internal polarization resistance of at least one of the cells. The purpose is to make the internal polarization resistance of the cell relatively small within the preset temperature range. In this state, the internal resistance of the cell is relatively small. Therefore, the measurement accuracy of the cell voltage can be improved, which is beneficial to improve the balance effect of the cell.

Of course, it is also feasible to detect the cell voltages of multiple cells. Exemplarily, the preset temperature value of the battery pack is set to be 30 to 55° C., and the preset voltage value is 50 mV. In the case where the charging circuit is disconnected and the battery pack is still inserted in the charger after the battery pack has been fully charged, it is detected by the temperature detection module that the temperature of the battery pack is 40° C. The cell voltage of the first cell is 4.20V, the cell voltage of the second cell is 4.18V, the cell voltage of the third cell is 4.08V, and the voltage difference between the first cell and the third cell is 120 mV, which is greater than the preset voltage value. In this case, the preset condition where the absolute value of the voltage difference is greater than or equal to the preset voltage value is satisfied, and thus it is determined to activate the balancing operation. In the condition where the cell voltage of the third cell is 4.19V, then the first cell is the cell with the maximum cell voltage in the battery pack and the second cell is the cell with the minimum cell voltage in the battery pack The voltage difference between the voltage of the first cell and the voltage of the second cell is 20 mV, which is less than the preset voltage of 50 mV. That is, the voltage difference between the cell with the maximum cell voltage and the cell with the minimum cell voltage in the battery pack does not satisfy the preset condition where the absolute value of the voltage difference is greater than or equal to the preset voltage value. Therefore, the voltage difference between the other cells in the battery pack does not satisfy the voltage preset condition, and thus it is determined not to activate the balancing operation.

Optionally, based on the preceding example, the step of activating the balancing operation includes performing a discharging operation on the cell having a relatively higher voltage than another in the at least two cells between which the voltage difference has an absolute value that is greater than or equal to the preset voltage value.

After it is determined to activate the balancing operation, the charging balancing system for a battery pack may perform the discharging operation on the cell with having a relatively higher voltage than another in the at least two cells between which the voltage difference has an absolute value that is greater than or equal to the preset voltage value. Therefore, the voltages of the cells are close to the same so that it can be ensured that all cells in the battery pack have the same working state.

In the solution provided in examples of the present disclosure, in the case where the charging circuit is disconnected and the battery pack is inserted in the charger after the battery pack has been fully charged, the temperature of the battery pack and the voltage of each cell in the battery pack are detected; the voltage difference between at least two cells in the battery pack is calculated according to the detected voltage of the cell; and it is determined whether to activate a balancing operation based on whether the voltage difference and the temperature satisfy the preset value. The cells on which the balancing operation needs to be performed are discharged. In this manner, the voltage difference between the cells can be reduced, and the cells can be kept in the same state during the use of the battery pack, which is beneficial to improve the longevity of the cells, thereby increasing the usage of the battery pack and delaying the aging of the battery pack.

Figure 2:
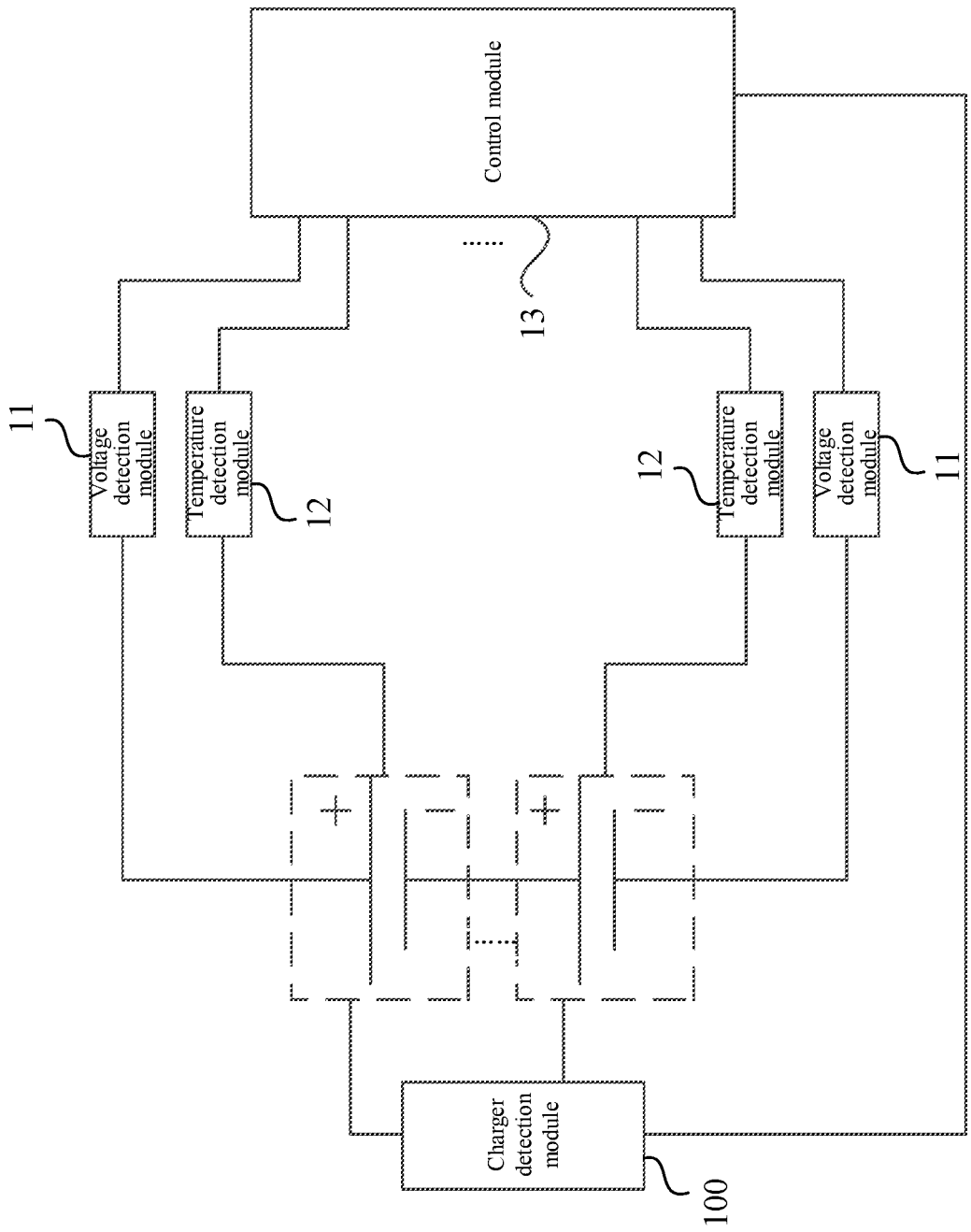
FIG. 2 is a block diagram illustrating another charging balancing system for a battery pack according to a second example of the present disclosure.

FIG. 2 is a block diagram illustrating the structure of a charging balancing system for a battery pack according to example two of the present disclosure. Referring to FIG. 2, this charging balancing system for a battery pack includes a voltage detection module 11, a temperature detection module 12, and a control module 13. The voltage detection module 11 is configured to detect the voltage of each cell in the battery pack in a preset state.

The temperature detection module 12 is configured to detect the temperature of the battery pack in the preset state.

The control module 13 is electrically connected to the voltage detection module and the temperature detection module. The control module is configured to calculate the voltage difference between at least two cells in the battery pack according to the voltage of the cell and determine whether to activate a balancing operation based on the voltage difference and the temperature.

Specifically, after the battery pack has been fully charged, the charging circuit of the charger is disconnected. Since the cell in the battery pack has an internal resistance, heat loss occurs during the charging process so that the temperature of the cell rises. After the battery pack has been fully charged, the temperature of the battery pack reaches the maximum and then gradually decreases. The temperature detection module 12 measures the temperature of the battery pack, and the voltage detection module 11 measures the voltage of each cell. Of course, in the case where the temperature of each battery pack measured by the temperature detection module 12 satisfies the preset temperature value, the voltage detection module 11 measures the voltage of each cell. In the case where the voltage detection module 11 and the temperature detection module 12 respectively measure the temperature of the battery pack in the preset state and the voltage of each cell, the control module 13 calculates the voltage difference between at least two cells according to the measured voltage, and the control module 13 determines whether to activate the balancing operation according to the magnitude relationship between the calculated voltage difference and the preset voltage value.

Optionally, based on the preceding example, with continued reference to FIG. 2, this charging balancing system for a battery pack further includes a charger detection module 100 configured to detect the connection between the battery pack and a charger.

The preset state is a state in which the charging circuit is disconnected and the battery pack is connected to the charger after the battery pack has been fully charged.

Specifically, the charger detection module 100 is electrically connected to the control module 13. After the battery pack has been fully charged, the charging circuit is automatically disconnected, and the control module 13 controls the charger detection module 100 to detect the connection between the battery pack and the charger. In the condition where the battery pack is not connected to the charger, that is, the battery pack is not in the charger, the balancing operation is not performed on the cells in the battery pack. Only in the case where the charging circuit is disconnected and the battery pack is still inserted in the charger after the battery pack has been fully charged, the cell balancing operation is performed. Since the temperature of the cell is relatively high in this case, the internal polarization resistance of the cell is relatively small so that the voltage of the cell detected by the voltage detection module 11 is relatively accurate, which is beneficial to improve the balancing effect of the cell.

Optionally, the control module 13 is configured to perform the step described below.

In the condition where the absolute value of the voltage difference is greater than or equal to the preset voltage value and the temperature of the cell satisfies the preset temperature value, then the balancing operation is started.

Specifically, the preset voltage value may be 0 to 100 mV and the preset temperature value may be 30 to 55° C. For example, the voltage difference between two cells is 40 mV and the temperature of the battery pack is 45° C. In this case, the preset condition where the absolute value of the voltage difference is greater than or equal to the preset voltage value and the temperature of the cell satisfies the preset temperature value is satisfied, and thus the control module 13 determines to activate the balancing operation.

In the solution provided in examples of the present disclosure, in the case where the charging circuit is disconnected and the battery pack is inserted in the charger after the battery pack has been fully charged, the temperature of the battery pack and the voltage of each cell are detected; the voltage difference between at least two cells in the battery pack is calculated according to the detected voltage of the cell; and it is determined whether to activate a balancing operation based on whether the voltage difference and the temperature satisfy the preset value. Limiting conditions of the temperature are added so that the measurement accuracy of the cell voltage can be improved, and each cell can be better balanced, which is beneficial to improve the balancing effect.

Figure 3:
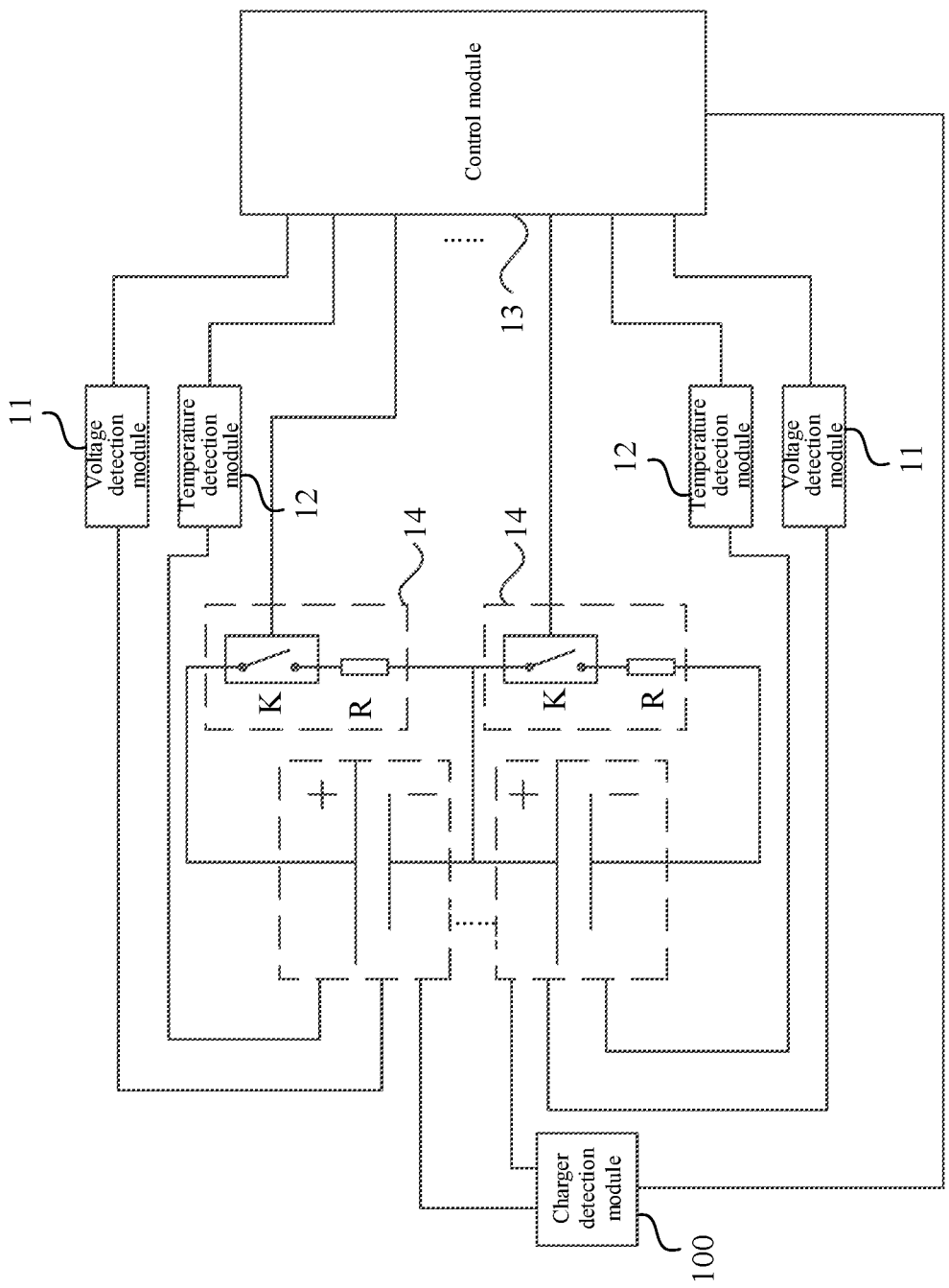
FIG. 3 is a block diagram illustrating another charging balancing system for a battery pack according to a third example of the present disclosure.

FIG. 3 is a block diagram illustrating the structure of another charging balancing system for a battery pack according to example three of the present disclosure. Referring to FIG. 3, this charging balancing system for a battery pack further includes a discharging module 14. The discharging module 14 is connected in parallel with the cell. The control end of the discharging module 14 is electrically connected to the control module 13. The discharging module 14 is configured to perform a discharging operation on the cell.

Specifically, each cell is connected in parallel with a discharging module 14, and the discharging module 14 is controlled by the control module 13. In the case where it is detected that the absolute value of the voltage difference between two cells is greater than or equal to the preset voltage value, it may be determined that there is a voltage difference between the two cells. The temperature of the cell has a relatively great impact on the internal resistance of the cell. Therefore, in the condition where the temperature of the two cells also satisfies the preset temperature value in this case, it means that the measurement results of the voltage values of two cells in the current state are accurate so that it is determined to activate the balancing operation. In this case, the control module 13 controls the discharging module 14 so that a closed loop is formed between the discharging module 14 and a corresponding cell. The voltage of the cell with a relatively high voltage is discharged through the discharging module 14 so that the voltages of two cells can be the same or close to each other numerically. After being discharged, each cell goes into a deep sleep. In the case where the cell voltages of multiple cells are detected, in the condition where the voltage difference between the maximum cell voltage and the minimum cell voltage does not satisfy the preset condition where the absolute value of the voltage difference is greater than or equal to the preset voltage value, then the voltage difference between the other cells in the battery pack does not satisfy the preset condition. In this case, it is determined not to activate the balancing operation and each cell directly goes into a deep sleep.

Optionally, the discharging module 14 is configured to perform the step described below.

The discharging operation is performed on a cell having a relatively higher voltage than another in the at least two cells between which the voltage difference has an absolute value that is greater than or equal to the preset voltage value after the control module 13 determines to activate the balancing operation.

Exemplarily, after the battery pack has been fully charged, it is detected that the temperature of the cell is 45° C. The cell voltage of the first cell is 4.20V, the cell voltage of the second cell is 4.16V, and the voltage difference between the first cell and the second cell is 40 mV. In this case, the preset condition where the absolute value of the voltage difference is greater than or equal to the preset voltage value and the temperature of the battery pack also satisfies the preset temperature value is satisfied, and thus it is determined to activate the balancing operation. The control module 13 controls the discharging module 14 to close and discharges the first cell so that the voltages of the first cell and the second cell can be the same or close to each other numerically and the voltage balancing of the two cells can be achieved.

In another example, the temperature of the battery pack detected by the temperature detection module is 40° C. The cell voltage of the first cell is 4.20V, the cell voltage of the second cell is 4.18V, and the cell voltage of the third cell is 4.19V; and the first cell is the cell with the maximum voltage in the battery pack, and the second cell is the cell with the minimum voltage in the battery pack. The voltage difference between the voltage of the first cell and the voltage of the second cell is 20 mV, which is less than the preset voltage of 50 mV. That is, the voltage difference between the cell with the maximum cell voltage and the cell with the minimum cell voltage in the battery pack does not satisfy the preset condition where the absolute value of the voltage difference is greater than or equal to the preset voltage value. Therefore, the voltage difference between the other cells in the battery pack does not satisfy the voltage preset condition, and thus it is determined not to activate the balancing operation.

Based on the preceding example, with continued reference to FIG. 3, the discharging module 14 includes a switch K and a resistor R. The first end of the switch K is electrically connected to the positive electrode of the cell. The second end of the switch K is electrically connected to the first end of the resistor R. The second end of the resistor R is electrically connected to the negative electrode of the cell. The third end of the switch K is electrically connected to the control module 13.

Specifically, the resistor R is configured to consume the voltage of the cell. In the case where the voltage detection module 11 detects that the voltages of two cells are the same or close to each other numerically, the control module 13 may control the switch K in the discharging module 14 to be turned off so that discharging can be stopped. Exemplarily, the switch K may be a relay, and the switch K is controlled to be turned on or off by the control module 13. The resistor R may be a resistor with a small resistance value. In this manner, the discharging speed of the cell connected in parallel with the resistor R can be relatively fast, and the cell balancing efficiency is relatively high, which is beneficial to improve the balancing effect.

In the solution provided in examples of the present disclosure, in the case where the charging circuit is disconnected and the battery pack is inserted in the charger after the battery pack has been fully charged, the temperature of the battery pack and the voltage of each cell are detected; the voltage difference between at least two cells in the battery pack is calculated according to the detected voltage of the cell; and it is determined whether to activate a balancing operation based on whether the voltage difference and the temperature satisfy the preset value. After it is determined to activate the balancing operation, the control module controls the discharging module to discharge the corresponding cell. Limiting conditions of the temperature are added so that the measurement accuracy of the cell voltage can be improved, and each cell can be better balanced, which is beneficial to improve the balancing effect.

Figure 4:
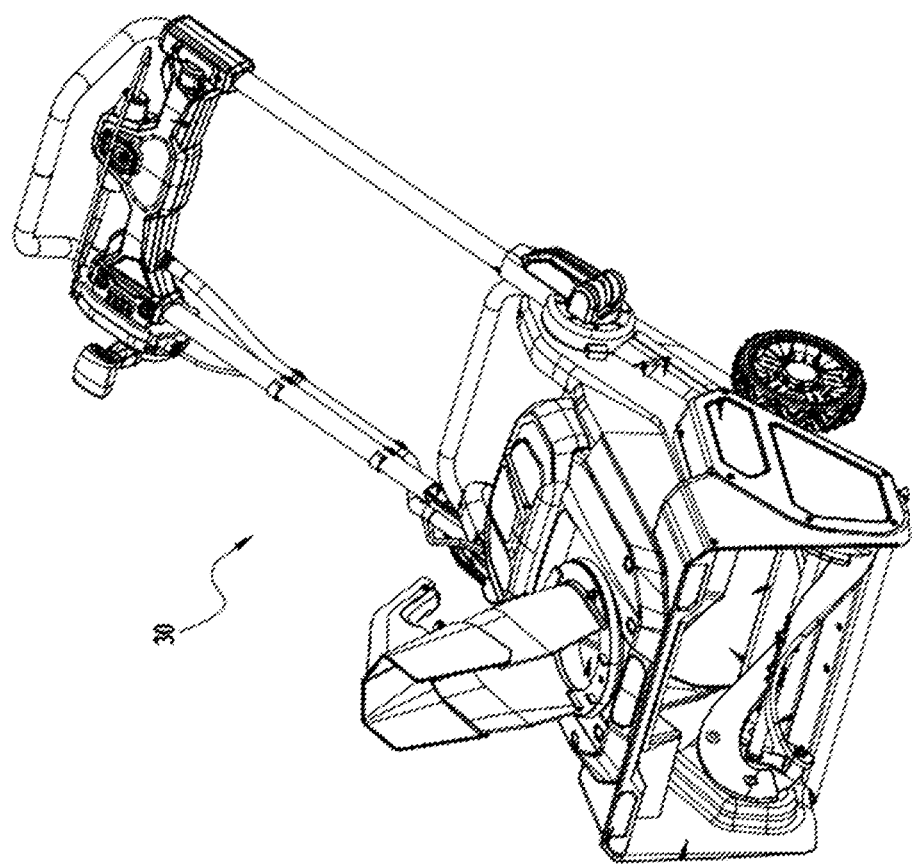
FIG. 4 is a schematic view of a power tool according to a fourth example of the present disclosure.
Figure 5:
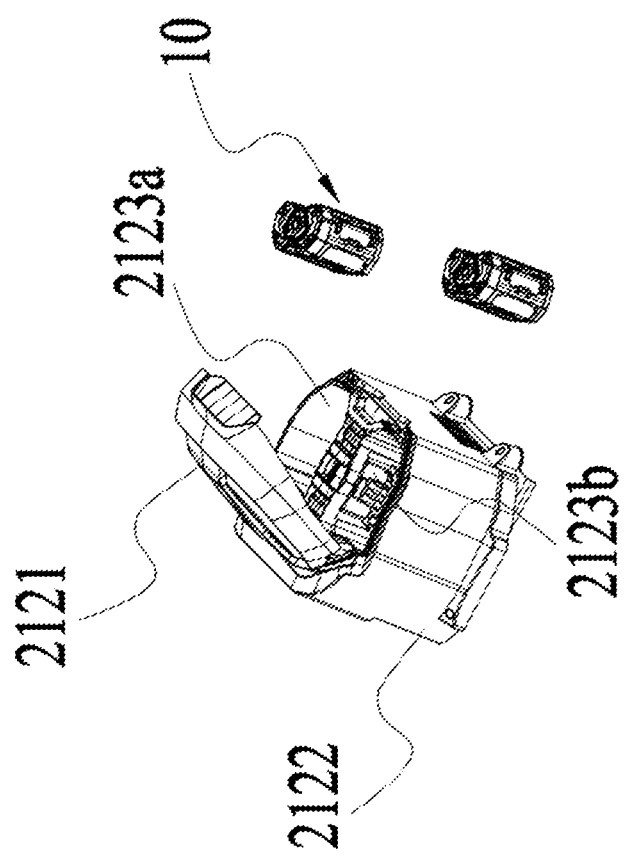
FIG. 5 is a schematic view of a battery pack according to the fourth example of the present disclosure.

FIG. 4 is a schematic view of a power tool according to a fourth example of the present disclosure. FIG. 5 is a structure view of a battery pack according to example four of the present disclosure. Referring to FIG. 4 and FIG. 5, the power tool is a hand-push snowplow 30. The battery pack 10 may be placed in a battery compartment body 2122. The battery compartment body 2122 is provided with a first cavity 2123a and a second cavity 2123b. The first cavity 2123a and the second cavity 2123b are used in the installation of the battery pack 10. The battery pack 10 is detachably connected to the hand-push snowplow 30. Although this example relates to the snowplow, it should be understood that the present disclosure is not limited to the disclosed example, but can be applied to other types of power tools, including, but not limited to, lawn mowers, hairdryers, angle grinders, electric drills, electric wrenches, and power saws.

Figure 6:
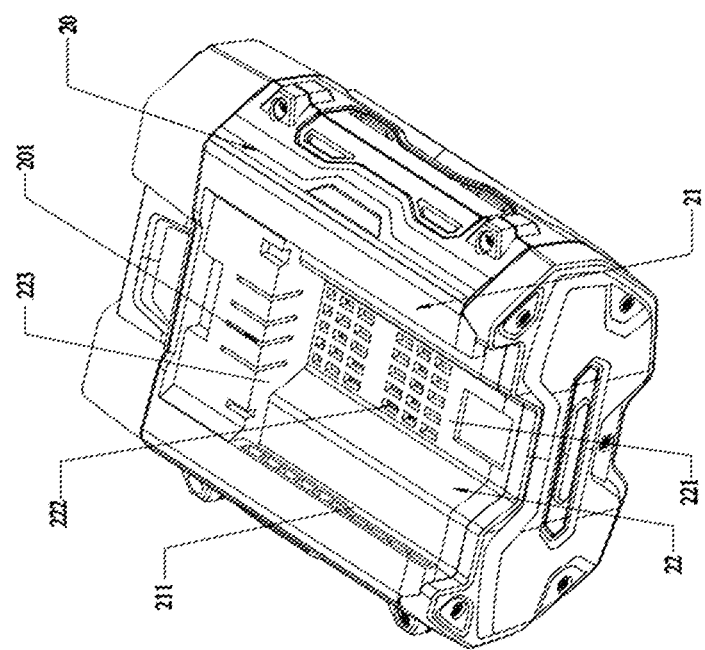
FIG. 6 is a schematic view of another battery pack according to the fourth example of the present disclosure.

FIG. 6 is a structure view of another battery pack according to example four of the present disclosure. Referring to FIG. 6, this battery pack includes the charging balancing system for a battery pack provided in the preceding examples, and this battery pack further includes a housing 20 and a cell set. This battery pack is detachably installed in a power tool to provide electrical energy for the power tool, and this battery pack is detachably installed in a charger to be charged by the charger. This battery pack includes the charging balancing system for a battery pack provided in any one of the preceding examples.

Specifically, the cell set is detachably installed in the housing 20 to form a battery pack, and the charging balancing system for a battery pack may be installed at the rear end of the battery pack. The cell set is an electrical energy container storing electrical energy in the battery pack and the cell set may store or output electrical energy through the mutual conversion between electrical energy and chemical energy. For example, the cell set may be a lithium battery pack and the cell set performs the energy conversion between electrical energy and chemical energy through a compound containing lithium.

This battery pack is detachably installed in a power tool, and this power tool may be a hand-push snowplow. Exemplarily, this battery pack has a mounting rail 21. The mounting rail 21 is formed by a guide groove 211 extending along the first direction. Along the first direction, the front end of the guide groove 211 is open and the rear end of the guide groove 211 is closed. An output terminal 201 is relatively close to the rear end of the guide groove 211 and is located between two guide grooves 211. In this manner, in the case where the battery pack is installed in a charger or a power tool from the front end to the rear end, the output terminal 201 can be connected to the charger or the power tool after the battery pack is installed at the rear end, thereby further ensuring the safety performance of the battery pack.

A housing groove 22 is recessed in the vertical direction of the first direction, and the length direction of the housing groove 22 is in parallel with the length direction of the battery pack. The housing groove 22 is used for matching with the corresponding structure in the charger or the power tool. Specifically, the housing groove 22 is formed between two cells forming the long bottom side of a trapezoid, and this housing groove 22 is located between two mounting rails 21. That is, two guide grooves 211 corresponding to the two mounting rails 21 are located on both sides of the width direction of the housing groove 22, and the slots of the two guide grooves 211 are oppositely disposed and both face one side of the housing groove 22. In a plane in parallel with the cross section of the cell, the output terminal 201 is in the depth direction of the housing groove 22 and is partially located in the housing groove 22, thereby facilitating the electrical connection with the charger and the power tool. The housing groove 22 includes a groove bottom surface 221 in parallel with the first direction. This groove bottom surface 221 is further provided with multiple hollowed-out heat dissipation holes 222. These heat dissipation holes 222 are configured to dissipate heat in the cell set inside the battery housing 20, thereby ensuring the normal operation of the battery pack.

After the battery pack provided in examples of the present disclosure is charged, the charging balancing system for a battery pack detects the voltage of the cell in the housing and the temperature of the battery pack, calculates the voltage difference between at least two cells in the battery pack according to the detected voltage of the cell, and determines whether to activate a balancing operation based on whether the voltage difference and the temperature satisfy the preset value. After it is determined to activate the balancing operation, the control module controls the discharging module to discharge the corresponding cell. Limiting conditions of the temperature are added so that the measurement accuracy of the cell voltage can be improved, and each cell can be better balanced, which is beneficial to improve the balancing effect, thereby increasing the utilization rate of the battery pack.

It is to be noted that the foregoing merely depicts some illustrative examples of the present disclosure and the technical principles used therein. It is to be understood by those skilled in the art that the present disclosure will not be limited to the examples described herein. Those skilled in the art can make various apparent modifications, adaptations, and substitutions without departing from the scope of the present disclosure. Therefore, while the present disclosure has been described in detail through the preceding examples, the present disclosure will not be limited to the preceding examples and may include more other equivalent examples without departing from the concept of the present disclosure. The scope of the present disclosure is thus determined by the scope of the appended claims.

What is claimed is:

1. A battery pack, comprising:
   a voltage detection module configured to detect a voltage of each of a plurality of cells in the battery pack under a preset state;
   a temperature detection module configured to detect a temperature of the battery pack under the preset state; and
   a control module, electrically connected to the voltage detection module and the temperature detection module, configured to calculate a voltage difference between at least two cells in the battery pack based on the voltage of each of the plurality of cells and determine whether to activate a balancing operation based on the voltage difference and the temperature,
   wherein the control module is configured to activate the balancing operation when the voltage difference is greater than or equal to a preset voltage value and the temperature of the battery pack satisfies a preset temperature value,
   the preset temperature value is determined based upon an internal polarization resistance of at least one of the cells, and
   the preset state is a state in which a charging circuit is disconnected and the battery pack is coupled to a charger after the battery pack has been fully charged;
   wherein the control module is configured to not perform the balancing operation on the cells in the battery pack when the battery pack is not connected to the charger.

2. The battery pack of claim 1, further comprising a discharging module connected in parallel with each of the plurality of cells, wherein the discharging module has a control end electrically connected to the control module, the discharging module is configured to perform a discharging operation on each of the plurality of cells, the discharging module comprises a switch and a resistor, a first end of the switch is electrically connected to a positive electrode of each of the plurality of cells, a second end of the switch is electrically connected to a first end of the resistor, a second end of the resistor is electrically connected to a negative electrode of each of the plurality of cells, and a third terminal of the switch is electrically connected to the control module.

3. The battery pack of claim 1, further comprising:
   a charger detection module configured to detect the connection between the battery pack and the charger.

4. The battery pack of claim 1, wherein the preset voltage value lies in a range of 0 to 100 mV.

5. The battery pack of claim 4, wherein the preset temperature value lies in the range of 30 to 55° C.

* * * * *